United States Patent
Willihnganz

[15] 3,657,639
[45] Apr. 18, 1972

[54] METHOD AND APPARATUS FOR MEASURING THE STATE OF CHARGE OF A BATTERY USING A REFERENCE BATTERY

[72] Inventor: Eugene A. Willihnganz, Lafayette Hill, Pa.
[73] Assignee: ELTRA Corporation, Toledo, Ohio
[22] Filed: June 22, 1970
[21] Appl. No.: 47,935

[52] U.S. Cl. ........................................................324/29.5
[51] Int. Cl. ........................................................G01n 27/46
[58] Field of Search................324/29.5; 340/249; 136/182; 320/48

[56] References Cited

UNITED STATES PATENTS

| | | | |
|---|---|---|---|
| 1,426,868 | 8/1922 | Haskins | 324/29.5 |
| 1,373,951 | 4/1921 | Cox et al | 324/29.5 |

FOREIGN PATENTS OR APPLICATIONS

| | | | |
|---|---|---|---|
| 236,284 | 7/1925 | Great Britain | 324/29.5 |
| 254,852 | 7/1926 | Great Britain | 324/29.5 |

Primary Examiner—Rudolph V. Rolinec
Assistant Examiner—R. J. Corcoran
Attorney—D. Henry Stoltenberg

[57] ABSTRACT

A device for testing storage batteries particularly of the lead-acid type to determine whether the individual cells of the battery are accepting charge and are in suitable condition to perform their intended function, which comprises a miniature reference cell cooperating with the cell being tested by means of a tube filled with electrolyte in electrical circuit with the cell electrolyte, so that electrical potentials between the negatives of the reference cell and the test cell, and also the potentials between the positives can be determined by a suitable voltmeter to indicate the condition of the respective negative and positive plates of the cell being tested.

8 Claims, 3 Drawing Figures

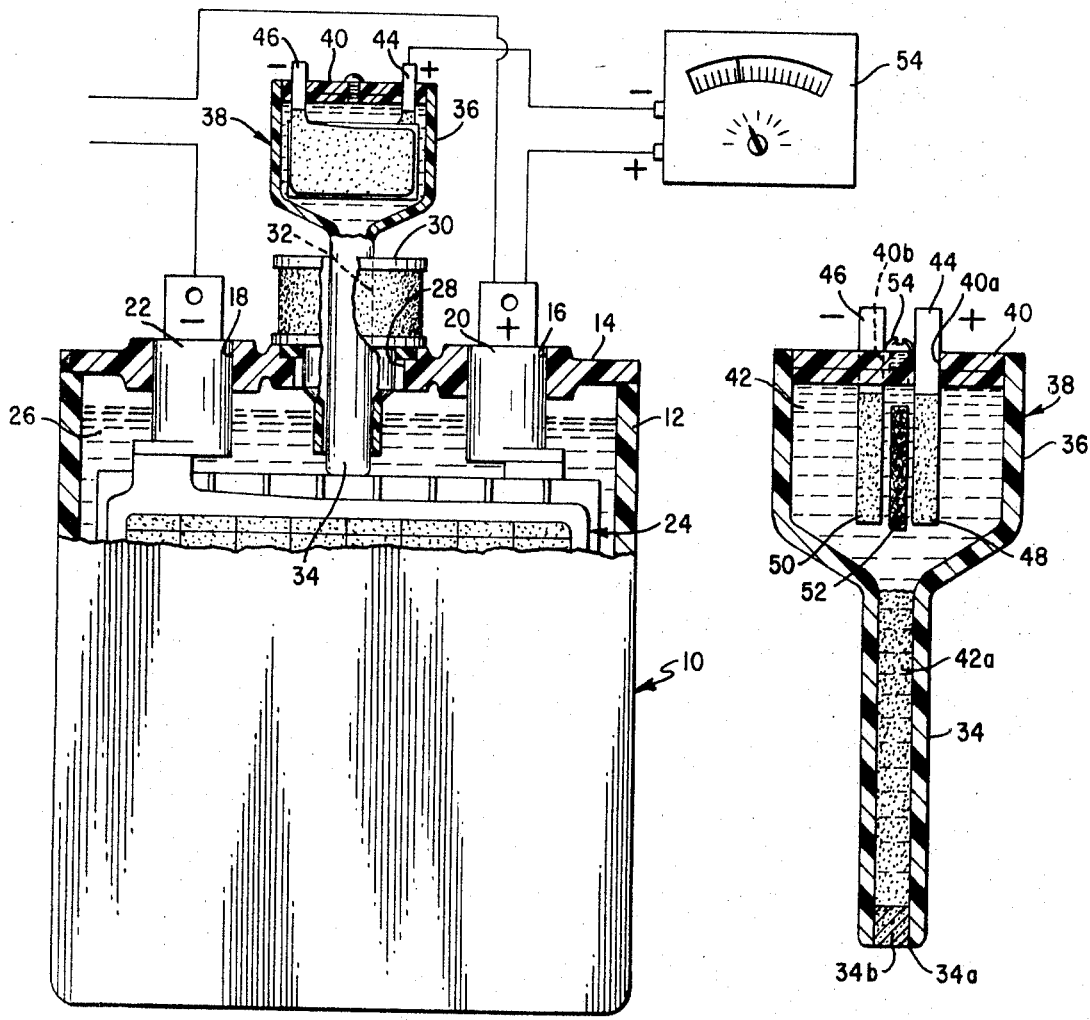
Fig. 1
Fig. 2
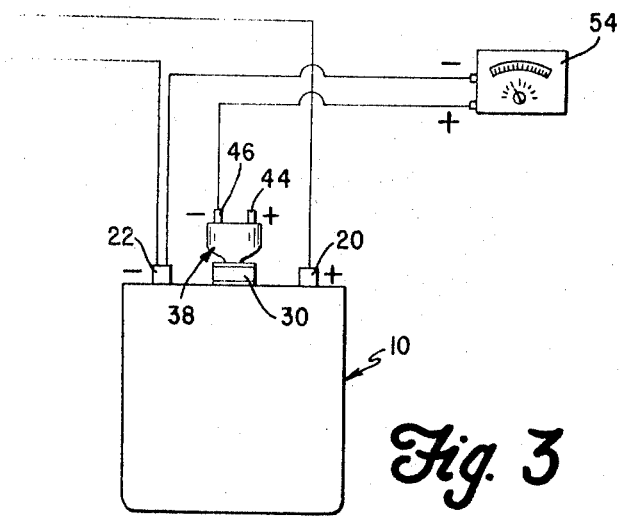
Fig. 3
INVENTOR.
EUGENE A. WILLIHNGANZ
BY
D. Henry Stoltenberg
ATTORNEY

METHOD AND APPARATUS FOR MEASURING THE STATE OF CHARGE OF A BATTERY USING A REFERENCE BATTERY

Lead-acid storage batteries are frequently used as an auxiliary power source for use in emergencies in the event an interruption of the main power source which often could result in serious consequences. These so called "stationary batteries" are normally kept fully charged by means of a constant potential charger which supplies enough energy to compensate for internal losses in the cells so that the fully charged condition is maintained. This is accomplished by maintaining the charging voltage slightly higher than the open circuit voltage of the battery, resulting in a "float" current which normally maintains all of the cells at full charge. However, in some instances, due to localized conditions, some battery cells lose their charge and become partially discharged, so that the low cells must be brought back to normal charge by means of an additional or equalizing charge. In some cases, it may be necessary to remove the deficient cell from the battery to maintain the overall efficiency of the battery.

The loss of charge in the low cells may be due to the unfavorable conditions at either its positive or negative plates so that it becomes essential for an operator to know the condition causing the loss of charge and whether or not it can be corrected by the additional equalizing charge. This requires a testing device which can differentiate between the conditions at the positive and negative plates, and for this purpose a third electrode is required. Such an electrode must make electrical contact with the electrolyte of the cell being tested, and is used with a voltmeter to measure the potential between the third electrode and either the positive or negative terminal of the cell.

In the past, this has been done with a cadmium electrode inserted in the vent opening of the cell being tested to make contact with the electrolyte which provides a means for measuring the desired potentials as pointed out above. This has been found suitable for testing small batteries such as automotive batteries, but is inadequate for large stationary standby batteries, as not being sufficiently sensitive or accurate for the purpose intended. The readings with cadmium electrodes used for this purpose are not reliable within 20 millivolts while for stationary batteries the reading must be accurate within 5 millivolts if the final testing results are to fulfill their purpose.

In a similar manner, a mercury third electrode has also been used, which consists of a small pool of mercury positioned in a sulphuric acid electrolyte which has been saturated with mercury sulphate. This reference electrode is then connected to the electrolyte of the cell being tested by a glass capillary filled with electrolyte and the potentials measured as before with a potentiometer. A voltmeter may not be used for the purpose in that it requires a current draw which polarizes the mercury pool surface to produce a false reading. Even when a potentiometer is used, current may be drawn sufficient to polarize the mercury surface and cause a false reading. Such polarization is often hard to determine and necessitates frequent calibration with the result that the readings are laborious and of doubtful validity, so that the mercury test device becomes impracticable.

The present invention contemplates the provision of a testing device to overcome these disadvantages and provides a method and a means whereby the significant potentials can be measured in a cell being tested to establish the condition of charge of either the negative or positive plates of the cell. At the same time, the efficiency of the test device is easily ascertained before reading such potentials by measuring the potential of a reference cell used in the testing device. The reference cell consists of a pair of simple electrodes in plate form separated by a membrane of microporous material positioned in a body of electrolyte in electrical circuit with the electrolyte of the cell being tested. The reference cell is a small lead-acid battery charged to a predetermined potential which can be used to measure the negative to negative and the positive to positive potentials of the cells connected together via the electrolyte. A substantial measuring current can be drawn by a voltmeter in the circuit without causing polarization to result in a false reading.

It is therefore a principal object of this invention to provide a method and means for ascertaining the condition of both the positive and negative plates of a lead-acid battery cell which utilizes a reference cell so that the negative to negative and positive to positive potentials can be accurately measured.

It is a further object of this invention to provide a testing means for lead-acid batteries which uses a reference cell whose potential can be easily measured to assure the accuracy of the test conditions.

It is a further object of this invention to provide a simple, reliable test device for lead-acid batteries, particularly applicable to stationary batteries, which measures the state of charge of either the positive or negative plates of the battery being tested.

Other objects and advantages of this invention relating to the arrangement, operation and function of the related elements of the structure, to various details of construction, to combinations of parts and to economics of manufacture will be apparent to those skilled in the art upon consideration of the following description and appended claims, reference being had to the accompanying drawings forming a part of this specification wherein like reference characters designate corresponding parts in the several views.

FIG. 1 is a sectional elevation of a lead-acid battery cell to which a test device incorporating the invention has been applied.

FIG. 2 is a sectional elevation of the test device taken at right angles to that shown in FIG. 1 showing the details of construction of a reference cell removed from the cell being tested.

FIG. 3 is a schematic diagram of connections showing the circuit whereby the negative to negative potentials of the test cell are being measured.

Referring to the drawings, particularly to FIG. 1, a lead-acid battery cell 10 is shown to which the testing device incorporating the invention has been applied. The battery cell consists of a housing 12 of glass or similar material having a cover 14 provided with apertures 16 and 18 through which the positive and negative terminals 20 and 22 of the battery project in a conventional manner. The lead-acid battery cell element 24 positioned in the container 12 is of conventional construction and consists of positive and negative plates interleaved together being separated by microporous separators in the well known manner. The battery cell element 24 consisting of the positive and negative plates with the separators is immersed in a sulphuric acid electrolyte 26 to a predetermined level as shown in FIG. 1. At a central location in the cover 14, a filling and venting aperture 28 is provided which vents the gases from the cell container and also allows an operator to replenish the electrolyte in the cell to maintain it at its predetermined level. The aperture 28 is provided with a suitable venting closure 30 is sealed relation therewith which may be of the explosion-proof type as is well known in the art.

The venting closure 30 is provided with a central aperture 32 through which projects the elongated downwardly projecting stem 34 of a funnel-shaped container 36 in which is mounted a reference cell 38 as will be described hereinafter. The bottom 34a of the stem projects downwardly in the interior of the cell container 12 until it is almost in contact with the upper portion of the battery cell element 24 to assure that the bottom is at all times below the level of the electrolyte in the battery cell.

The funnel-shaped housing 36 is preferably made of an acid-resisting, non-conducting material such as glass or clear plastic with the downwardly-projecting stem 34 being integral with the main body and preferably of tubular conformation as shown. The upper end of the housing 36 is closed with a cover 40, also of acid-resisting, non-conducting material which may be cemented in position by any suitable means such as epoxy cement so that it seals the body to hold an electrolyte 42. The bottom end of the stem 34a is provided with a permeable closure 34b which may be of porous material to allow saturation with electrolyte 42 to allow electrical current to pass therethrough but is sufficiently dense to impede electrolyte leakage from the housing 36. This leakage can be further impeded by immobilizing the electrolyte in the stem 34 by adding sodium silicate which forms the electrolyte into a gel 42a. The concentration of the sulphuric acid electrolyte 42 is similar to the concentration of the electrolyte 26 in the main battery cell.

The cover 40 of the container 36 is provided with spaced apertures 40a and 40b through which project terminals 44 and 46 of the positive and negative plates 48 and 50 of the reference cell 38. The plates 48 and 50 are held in position from the cover 40 in depending relation to be immersed in the electrolyte 42, being interleaved by a separator 52 which is made of the usual material such as microporous rubber or the like. The container 36 is also provided with a manually-controlled venting means, which may be in the form of a screw 54 threaded into an aperture in the cover 40 so that it can be loosened to bleed off the gas pressure which may build up in the container.

The positive plate 48 of the reference cell 38 consists of a plate or grid of pure lead or of a lead-calcium alloy on which is pasted a body of active material in the form of lead dioxide as is well known in the art of fabricating lead acid batteries. In the same manner, the negative plate 50 of the reference cell 38 consists of a plate or grid of the same material as the positive plate, which is pasted with sponge lead as is well known in the fabrication of negative plates of lead-acid batteries. Both positive and negative plates are completely immersed in the electrolyte 42 which substantially completely fills the container 36, extending downwardly into the immobilized electrolyte portion in the stem 34. With the reference cell 38 in assembled relation, the stem of the housing of the cell is inserted into the aperture 32 of the closure member 30 until the bottom end 34a projects below the level of the electrolyte 26 in the cell to be tested, so that the voltage between the negative terminal 22 of the cell being tested and the negative terminal 46 can be measured by a suitable voltmeter 54 in a complete electrical circuit including the electrolytes of both the cell being tested and that of the reference cell. The circuit for the voltmeter is shown in FIG. 3. In a similar manner the voltage between the positive terminal 20 of the cell being tested and the positive terminal of the reference cell can be measured as shown in FIG. 1, which electrical circuit is also completed by the electrolytes of the two cells.

The voltmeter 54 used for measuring these voltages may be of the moving coil type which draws about 50 microamperes at full scale reading of 300 millivolts. Even a voltmeter drawing about 1 milliampere can be used without a prohibitive loss in accuracy. The more sensitive voltmeters having high resistance are preferred including electronic meters.

Before the voltage measurements are taken, the reference cell 38 must first be stabilized so that the voltage taken across the terminals 44 and 46 is at the normal open circuit voltage. This is accomplished by connecting the reference cell 38 in parallel with the main cell 10 while the main cell to be tested is on "float" charge, which usually occurs at a "float" potential of 2.17-2.25 volts. The charge of the reference cell 38 continues until it is fully charged, at which time it it is disconnected from the main cell and allowed to stand idle until its voltage drifts downwardly from the "float" charging voltage to the normal open circuit potential of 2.065-2.055 volts, which normally requires from 24 to 48 hours.

The positive to positive and the negative to negative voltages are then taken with the circuit arrangements as shown in FIGS. 1 and 3 respectively. In a lead-calcium battery, the positive to positive voltage reading for a normal battery in good condition falls into a range of 50-80 millivolts, and the negative to negative voltage reading in a range of 20-100 millivolts. For a lead-antimony battery the positive to positive voltage falls into a range of 70-100 millivolts for a normal battery in good condition, while the negative to negative falls into a range of 20-50 millivolts.

These measured voltage between the reference cell and the cell being tested indicate the condition of the cells long before the condition is reflected in the gravity readings of the electrolyte. If the voltages measured drift outside of the ranges mentioned, an unstable condition is indicated which should be corrected particularly if taken into consideration with the gravity readings of the electrolyte. A cell which is failing is clearly indicated and also a cell which requires equalizing charges.

Although the method of testing has been disclosed with reference to a lead-acid battery, it will be appreciated that the method can also be applied in an analogous manner to other batteries, such as alkaline cells and the like.

I claim:

1. The method of testing the condition of a cell of a battery, which consists of providing a reference battery cell of the same type, housed in a separate container, placing the electrolyte of the reference cell in electrical circuit with the electrolyte of the cell being tested, fully charging the reference battery and stabilizing its voltage to normal open cell voltage, and measuring positive to positive voltage between the two cells and the negative to negative voltage.

2. The method set forth in claim 1 further characterized by equalizing the gravity readings of the electrolytes of the two cells, before making the voltage readings.

3. The method set forth in claim 1 further characterized by placing both cells on "float" charge before making the voltage readings.

4. The method set forth in claim 3 further characterized by utilizing a lead-acid battery and stabilizing the voltage of the reference cell to a normal open circuit voltage of 2.065 to 2.055 volts.

5. In a device for testing the condition of the cells of a lead-acid battery having positive and negative terminals and an acid electrolyte, a reference lead-acid cell having a positive plate, a negative plate and an acid electrolyte housed in a separate container, said reference cell being in fully charged state with a stabilized open cell voltage, means to place in electrical circuit the electrolyte of the cell being tested and the electrolyte of the reference cell, and voltage measuring means to measure the voltage of the positive to positive and the negative to negative terminals of the two cells.

6. The device defined in claim 5 further characterized by the separate container for the reference cell being in the form of a vented funnel-shaped housing having a tubular depending extension filled with gelled electrolyte adapted to be inserted into the cell container of the cell to be tested to place the electrolyte of the two cells in electrical connection.

7. The device defined in claim 5 further characterized by placing both cells on "float" charge before taking the voltage readings.

8. The device defined in claim 7 further characterized by stabilizing the voltage of the reference cell to open circuit voltage 2.065 to 2.055 volts.

* * * * *